July 8, 1958 G. E. FRANCK 2,842,382
VALVED CONNECTOR
Filed Feb. 7, 1955

INVENTOR.
George E. Franck,
BY

United States Patent Office 2,842,382
Patented July 8, 1958

2,842,382

VALVED CONNECTOR

George E. Franck, Riverside, Ill., assignor to The Imperial Brass Manufacturing Company, a corporation of Illinois Application February 7, 1955, Serial No. 486,348

3 Claims. (Cl. 284—18)

This invention relates to a valved connector and, in particular, to a connector with automatic integral valve means, adapted for fixed attachment to a source of pressurized fluid and for removable attachment thereto of the non-flared end of a tube.

Manifolds, tanks and similar means for storing pressurized fluids generally require the maintenance of the fluid pressure therein notwithstanding connections being made thereto and disconnections being made therefrom. To most effectively allow connection to such storage means, it is desirable to use a connector which effectively, sealingly engages the storage means, allows ready connection and disconnection of a non-threaded, unflared end of a tube thereto, provides automatic valve means to prevent discharge of the pressurized fluid from the storage means when the tube is disconnected and allows automatic communication between the pressurized fluid storage means and the tubing when it is connected thereto.

The principal object of my invention, therefore, is to provide a new and improved valved connector adapted for ready connection and disconnection of a tube to a maintained-pressure fluid source.

Another object of the invention is to provide such a valved connector having a body member adapted to be sealingly secured to a pressure fluid source and an interiorly arranged valve adapted automatically to prevent discharge from the source and through the connector when a discharge tube is not connected thereto.

A further object is the provision of such a valved connector wherein the valve may be automatically operated to allow communication between the fluid and the tube as an incident of the tube being attached to the connector.

A still further object is to provide such a connector with tube securing means adapted to removably secure a tube end to the connector so as to maintain communication between the fluid source and the tube and effect fluid-tight connection between the tube and the connector.

Still another object is to provide a valved connector of the character described above wherein the attachment of the tube to the connector automatically opens the valve, and the securing means maintains the attachment and effects fluid-tight connection between the tube and the connector.

A yet further object is to provide a valved connector arranged to have a first seal between a tube connected thereto before the valve is opened and allow subsequent insertion of the tube into the connector to open the valve, and provided with means for securing the tube in the inserted position to maintain the valve open and the tube in fluid-tight connection to the connector.

Other features and advantages of this invention will be apparent from the following description taken in connection with the accompanying drawings wherein.

Figure 1:
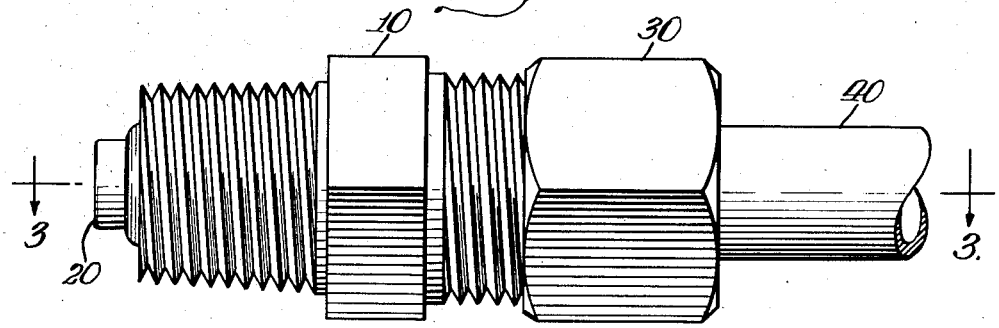
Fig. 1 is a side elevational view of a valved connector embodying the invention, showing a tube connected thereto.

In the exemplary embodiment of the invention disclosed in the drawings, the connector comprises generally a body member 10 having one end adapted to be more or less permanently engaged with a tank, manifold or other fluid pressure source and another end adapted to receive for quick connection or disconnection an end of tubing 40 to be supplied with fluid under pressure. Housed within the body member is a valve means generally designated 20 biased to closed position and moved to open position as an incident to attachment of the tubing 40 to the body member. Carried by the body member 10 at the end receiving the tubing 40 is means, generally designated 30, functioning in cooperation with the body member to effect a fluid-tight seal between the body member and the tubing and also to retain the tubing in such physical relationship relative to the body as to cause it to hold the valve in open position.

Body member 10 is generally tubular and is provided with a first externally threaded end 11 having an outwardly opening, axially disposed recess 11a. Threaded end 11 is adapted to sealingly engage a complementary, internally threaded port provided in the manifold or storage means (not shown) to which the connector is to be attached. A second, externally threaded end 12 is provided opposite end 11, having an axially disposed recess 12a opening outwardly into the outer end of portion 12 and forming thereon a rounded surface or radius 12b. Extending longitudinally through body member 10 is an axial, cylindrical bore 13 communicating at its ends with recesses 11a and 12a. Bore 13 is provided with a diameter somewhat less than that of the recesses and forms with recess 11a a radially, inwardly flared valve seat 11b, and with recess 12a a radially extending shoulder 12c. For purposes of engagement by tools such as wrenches, the exterior of the body member 10 between the threaded ends 11 and 12 is provided with flat, tool-engaging surfaces 14.

Figure 2:
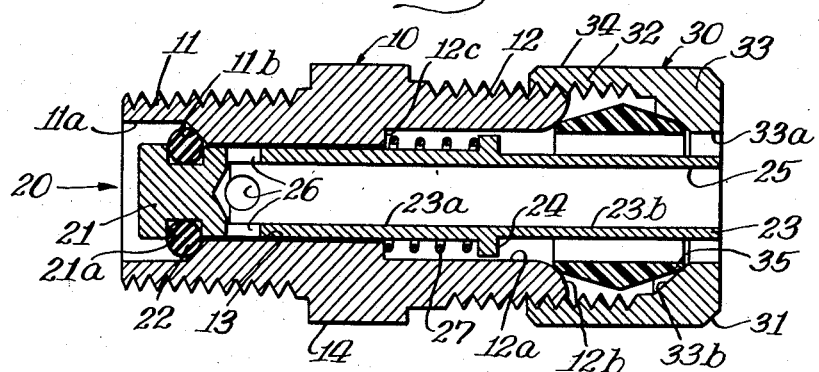
Fig. 2 is a diametrical sectional view of the connector in the normal, closed position.

Valve means 20 comprises a generally cylindrical member having a head 21 adapted to be received partially in recess 11a and partially in bore 13. Suitable means for removably seating the head 21 in the body member are provided, the structure disclosed herein being typical. Extending peripherally around the head 21 is annular groove 21a in which is mounted sealing means, O-ring 22. When valve 20 is in the normal, closed position, as seen in Fig. 2, O-ring 22 is seated against seat 11b, thereby preventing discharge through the connector of pressurized fluid from the source with which recess 11a is in communication.

Extending axially from head 21 of valve 20 is tubular stem 23. A peripheral, annular boss 24 having an external diameter slightly less than the diameter of recess 12a in which it is disposed is provided centrally on the stem 23; said boss divides the stem 23 into an inner portion 23a extending between the boss and the valve head 21, and an outer portion 23b extending generally outwardly from the recess 12a and through the connecting means 30. The external diameter of inner portion 23a is made slightly less than the diameter of bore 13 so that the stem may move freely longitudinally through the bore. So that the end of tubing 40 may be tightly received between the body member end 12 and the stem outer portion 23b, the external diameter of the outer portion is made comparable to the internal diameter of tube 40 and the diameter of the recess 12a is made comparable to the external diameter of tube 40. Extending axially through the stem is a cylindrical bore 25; a plurality of radially extending passages 26 are provided through the wall of inner stem portion 23a adjacent head 21 and communicating with the stem bore 25. As can be seen in Fig. 2, these passages are disposed within bore 13 when the valve is in the closed position preventing communication between bore 25 and recess 11a.

Figure 3:
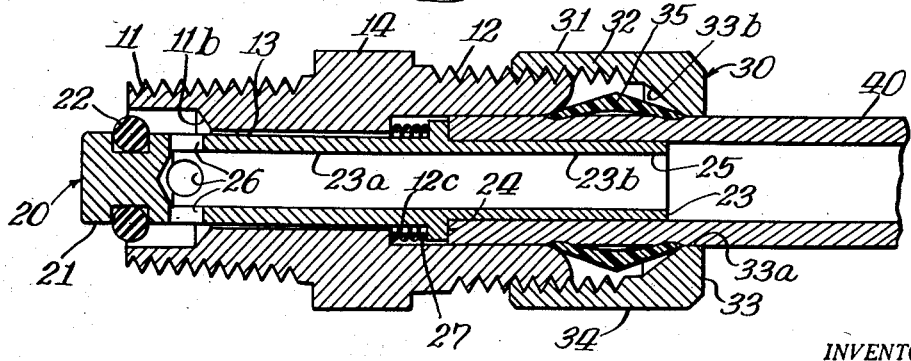
Fig. 3 is a sectional view taken approximately along the line 3—3 of Fig. 1 with the valve actuated open.

Helical valve spring 27 is concentrically mounted on valve stem portion 23a, extending between boss 24 and shoulder 12c. Spring 27 is provided with sufficient free length so as to provide a light but positive sealing force causing O-ring 22 to seat against flared seat 11b as seen in Fig. 2. The diameter of the wire comprising the spring is small allowing it to be compressed (as seen in Fig. 3) when the valve is moved to the open position.

Means 30 for sealingly securing the end of tube 40 to the connector comprise a nut 31 and an annular gasket 35. Nut 31 is generally cup-shaped, having an internally threaded, longitudinally extending portion 32 adapted for threaded engagement with externally threaded end 12 of the body member, and a radially inwardly extending flange 33 having an opening 33a. An angularly inwardly flared edge 33b is provided on the inner portion of flange 33 to provide improved coaction between nut 31 and annular gasket 35. The exterior periphery of the nut is provided with wrench engaging surfaces 34 similar to body member surfaces 14.

Annular gasket 35 comprises an annular member formed of a resilient sealing material such as "neoprene." The internal diameter of gasket 35 is made approximately equal to the external diameter of tubing 40 so that the gasket may be mounted thereon and be readily compressed into sealing and frictional holding engagement therewith. Such engagement is obtained by the action of nut 31 being threadedly advanced on body member end 12 so as to compress the gasket between body member radius 12b and nut member edge 33b, a radial, vectorial component of the resultant forces being produced to force the gasket tightly against the outer surface of tubing 40, as seen in Fig. 3. As longitudinal movement of the gasket within means 30 is prevented, tubing 40 is also prevented from longitudinal displacement by the frictional engagement as well as being sealingly secured to the body member.

The installation of my valved connector is extremely simple. The body member is first connected to the fluid source by sealingly securing the first threaded end 11 thereto so that recess 11a has communication with a threaded port in the fluid source. The valve 20, being in the position shown in Fig. 2, seals recess 11a closed by the seating of O-ring 22 on flared seat 11b under the urging action of valve spring 27 and the pressure of the fluid in the source.

To connect a tube to the source of fluid pressure the end of the tube is inserted through the nut opening 33a and gasket 35 and over valve stem portion 23b until it abuts the boss 24. A first seal is effected at this time between the tube and the connector by the tube end abutting boss 24 and generally filling the space between the valve stem 23 and the body member 10 within the recess 12a. The insertion of the tube is continued after the tube end abuts boss 24 so as to move the valve longitudinally leftward until the radial passages 26 are in communication with the recess 11a, thus connecting this recess with the interior of the tube 40 through bore 25 (as seen in Fig. 3).

Nut 30 is then threadedly advanced on end 12 of the body member until gasket 35 is compressed tightly onto the tube 40. In this way a second, permanent seal is effected between the tube 40 and the body member 10 and the tube is secured longitudinally so that the valve 20 will be maintained open. Pressurized fluid may now flow from the source, through the connector and into the tube 40.

To disconnect the tube from the connector with negligible pressurized fluid loss and with automatic stoppage of discharge from the source, nut 31 is unthreaded a small amount allowing the gasket 35 to release its holding and sealing engagement with the tube. The tube end may then be readily withdrawn, allowing the valve to move to the right into the position shown in Fig. 2 by action of the spring 27 and the fluid pressure in the recess 11a, thereby causing the O-ring to have sealing engagement with seat 11b and prevent further discharge from the recess.

As the force of the pressurized fluid from the source urges the valve into closed position, the spring 27 need not have great strength but is provided merely as a bias force to assure the closing of the valve under all conditions other than when the tube is inserted.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A valved connector comprising, in combination: an elongated body having a first recess opening outwardly through one end of the body, a second recess opening outwardly through the other end of the body and an axial bore connecting the recesses, the bore having a diameter less than each recess to form a shoulder at the inner end of each recess, the shoulder at the inner end of said first recess forming a valve seat; a valve member having a head disposed in said first recess and adapted to cooperate with the shoulder at the inner end of said first recess, and a tubular valve stem extending slidably through the bore and into said second recess, an annular external boss on said valve stem spaced outwardly of the bottom of said second recess and a plurality of radial ports opening through said stem immediately adjacent said valve head, a compression spring interposed between said annular boss and the said second recess shoulder yieldably urging said valve member in one longitudinal direction to a closed position; and means for effecting a fluid-tight seal between said body and a tube end inserted into said second recess coaxially of the valve stem to bear against said boss on the valve stem in opposition to said spring to urge said valve member in an opposite longitudinal direction to an opened position, said means comprising an annular sleeve resiliently compressible into gripping and sealing engagement with the tube and sealing engagement with said body member, and a nut means having threaded engagement with said body at said other end concentrically of the second recess for compressing engagement with said sleeve.

2. A valved connector comprising, in combination: an elongated body having a first recess opening outwardly through one end of the body, a second recess opening outwardly through the other end of the body and an axial bore connecting the recesses, the bore having a diameter less than each recess to form a shoulder at the inner end of each recess, the shoulder at the inner end of said first recess forming a valve seat; a valve member having a head disposed in said first recess and adapted to cooperate with the valve seat, and a tubular valve stem extending slidably through the bore into said second recess, means carried on the valve stem in said second recess for abutment by the end of a tube passed concentrically over the valve stem whereby movement of the tube end inwardly through the second recess moves the valve member so as to space the head from the valve seat in a valve open position, a plurality of radial ports opening through the valve stem immediately adjacent said valve head to communicate with said first recess when the valve is so moved, biasing means engaging means on the body and valve member for yieldably urging the valve member head into engagement with the valve seat in a valve closed position; and means for sealing the tube to the body and concurrently retaining the valve member in valve open position including a resilient annular gasket receivable around the tube to extend between the tube and the body at said other end, and a nut having threaded engagement with said body at said other end concentric of the second recess and provided with a flared edge acting against said gasket to force the gasket tightly against the tube and the body.

3. A valved connector comprising, in combination: an elongated body member having a first recess opening outwardly through one end of the body, a second recess opening outwardly through the other end of the body, and an axial bore connecting the recesses, the bore having a diameter less than each recess to form a shoulder at the inner end of each recess, the shoulder at the inner end of said first recess forming a valve seat; a valve member having a head disposed in said first recess adapted to cooperate with the valve seat at the inner end of said first recess, a tubular valve stem extending slidably through the bore and into said second recess, an annular boss on said stem in said second recess to be abutted sealingly by a tube end inserted into said second recess and to cause the movement of said valve with the tube when the tube is moved inwardly through said second recess, thereby to space the head from the valve seat, a passage through said stem having communication with the first recess when said head is so spaced, and spring means between the shoulder of the second recess and the boss to urge the valve into a closed position wherein the head is seated on said valve seat; and means for effecting a fluid-tight seal between said body and the tube inserted into the second recess and concurrently retaining the head spaced from the valve seat comprising an annular sleeve means resiliently compressible into gripping and sealing engagement with the tube and sealing engagement with the body member, and a nut having an annular edge coaxially aligned with said sleeve, said nut being secured to said body member for movement of said edge axially in compressing engagement with the sleeve.

References Cited in the file of this patent

UNITED STATES PATENTS

| | | |
|---|---|---|
| 546,732 | Desserich | Sept. 24, 1895 |
| 879,880 | Landau | Feb. 25, 1908 |
| 1,017,654 | De Grey | Feb. 20, 1912 |
| 1,596,260 | Thomson | Aug. 17, 1926 |
| 2,258,528 | Wurzburger | Oct. 7, 1941 |
| 2,265,267 | Cowles | Dec. 9, 1941 |
| 2,561,648 | Bradley | July 24, 1951 |